March 3, 1942. S. A. HUEBNER 2,274,984
METHOD OF MODERNIZING WOOD WAGON WHEELS
Filed July 11, 1940
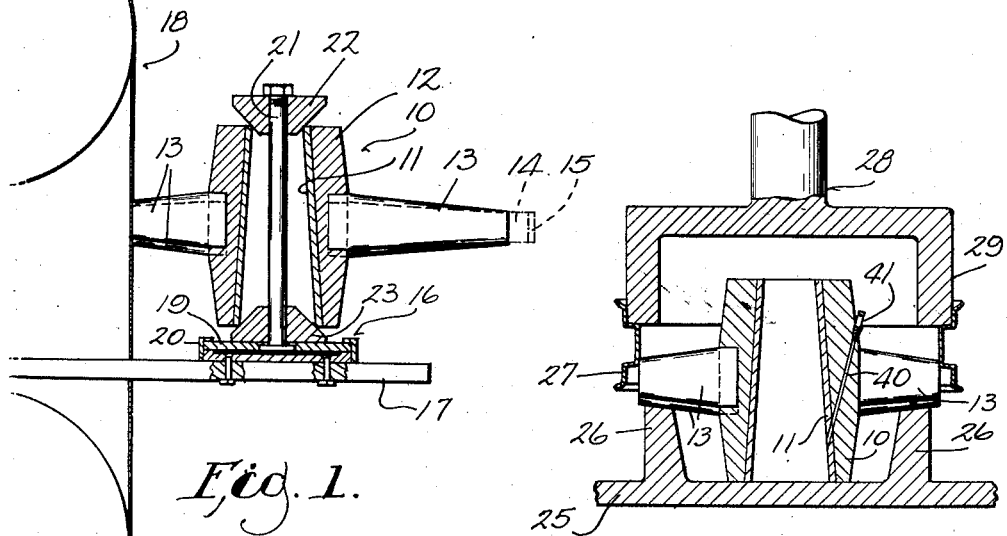
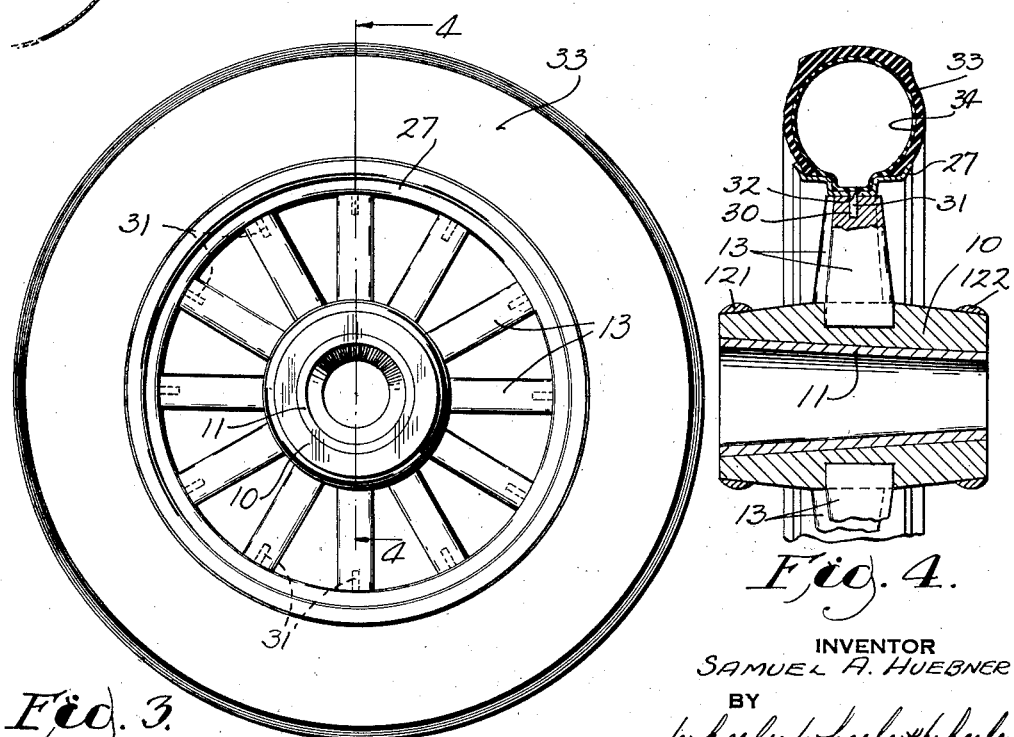
INVENTOR
SAMUEL A. HUEBNER
BY
Wheeler, Wheeler & Wheeler
ATTORNEYS.

Patented Mar. 3, 1942

2,274,984

UNITED STATES PATENT OFFICE 2,274,984

METHOD OF MODERNIZING WOOD WAGON WHEELS

Samuel A. Huebner, Forest Junction, Wis.

Application July 11, 1940, Serial No. 344,875

3 Claims. (Cl. 157—1)

My invention relates to improvements in wheels and the method of modernizing them.

The object of my invention is to modernize spoke type wagon wheels whereby to adapt them to high speed travel on modern roads.

More particularly stated, it is the object of my invention to equip spoke wagon wheels with suitable rims for reception of automotive type pneumatic tires, and to do this at such reasonable cost as to conserve the investment in wagons which would otherwise be obsolete and relatively useless.

In the drawing:

Figure 1 illustrates the first step in my method of modernizing a spoke wheel and shows a wheel mounted for presentation of its spokes to a band saw.

Figure 2 shows the second step in my method and illustrates a drop center automotive type rim in a press and in position for placement upon the fore-shortened spokes of a wheel.

Figure 3 is a side elevation of a modernized wagon wheel of my invention.

Figure 4 is a section on line 4—4 of Fig. 3.

Like parts are identified by the same reference characters throughout the several views.

Present day road travel at present day speeds on modern roads is virtually impossible for the time-honored "lumber wagon" or general utility wagon commonly used heretofore upon farms. Therefore, the capital invested in these farm wagons has represented a serious loss to the owners who have been compelled to abandon their use. The simplicity of the mechanical steps taken in accord with my invention and the low cost of materials needed to carry out my modernization make possible the economical salvaging of the farm wagon, adapts the wagon to modern road work at high speed, and improves the usefulness of the wagon for general purposes.

The ordinary farm wagon wheel 10 is a fabricated structure including a tapered sleeve 11 forming the wheel bearing, a wooden hub 12, and a suitable number of wooden spokes 13 mortised into the hub. As shown in Fig. 4 the wheel hub is bound by hub bands 121 and 122. A wooden felloe 14 and iron wheel rim 15, as indicated in dotted lines in Fig. 1, complete the wagon wheel as it has heretofore been constructed and used. In carrying out the steps of my method of modernizing wheels, I remove the felloe 14 and rim 15 of the wheel and mount the remaining wheel structure upon a jig 16 receivable upon the table 17 of a band saw 18. This jig includes a turntable plate 19 retained in a circular guide 20.

Extending upwardly from the turntable plate 19, I provide a spindle 21 upon which conical chuck members 22 and 23 are received. The wheel hub 12 with its bearing 11 and spokes 13 is placed upon the jig as shown in Fig. 1 so that the conical chuck members 22 and 23 may center it with respect to the spindle 21. The wheel 10 is then in position for the first major step in my method which comprises the fore-shortening of the spokes 13 and it will be apparent to those skilled in this art that as the band saw is operated and the wheel hub 12 is rotated, successive spokes 13 will be presented to the band saw which will accurately cut off surplus length in readiness for the second step of my method.

When the spokes have been cut to the desired length so as to reduce the over-all diameter of the spoke ends to a predetermined diameter of the "cut down" wheel rim, I place the wheel hub centrally of a press bed 25, an annular upward extension of which at 26 is gauged to receive the sides of the spoke ends and support them during the second step in my method which comprises the pressing upon the spoke ends of a modern automotive type steel rim 27. For this purpose I use any type of ram 28 equipped with an annular head 29 to bear upon the steel rim while the rim is being pressed upon the spoke ends. When this second step of my method is complete the steel rim is substantially centered upon the spoke ends and the third and final step of my method completes the process.

Axially of each spoke I bore through the steel rim 27 a hole indicated at 30 for the reception of a dowel 31 which is then welded at 32 to permanently dispose the dowel in position to hold the rim 27 upon the spokes and after the welded joint has been "dressed" in a grinding operation to smooth the interior of the rim, the wheel is in readiness for the reception of an automotive type pneumatic tire casing 33 and inner tube 34, thus completing a modernized wheel receivable upon the skein of the typical lumber or farm wagon.

To complete the modernization of the wagon and wheel, I provide a grease bore 40 in the exterior of the hub. Diagonally of the hub and its bearing sleeve 11, I provide this grease bore with a grease fitting 41 so that grease under pressure may be introduced to the bearing at its large end 11 since I have noted that grease naturally moves to the outer or small end of the bore.

It will thus be seen that the only material required to carry out my invention is the rim 27 which is a stock article in modern automotive trade and is of relatively low cost. The diameter of the rim chosen for my modernization of wagon wheels is, of course, the more popular size so that tires of reasonable price may be utilized, thus assuring that the wagon is not only modernized at a low expense, but assuring also that the cost of operation will be kept at a minimum. The entire wagon is therefore made useful and the investment of the price of a modern wagon is avoided.

I claim:

1. The method of modernizing a wood wagon wheel including the steps of shortening the spokes by cutting them at an accurately determined distance from the axis of the wheel, supporting the shortened spokes and hub in position to receive pressure, pressing onto the ends of the spokes a modern steel rim for the reception of an inflatable rubber tire.

2. The method of modernizing a wood wagon wheel including the steps of shortening the spokes by cutting them at an accurately determined distance from the axis of the wheel, supporting the shortened spokes and hub in position to receive pressure, pressing onto the ends of the spokes a modern steel rim for the reception of an inflatable rubber tire, and doweling the rim in position on the spokes.

3. The method of modernizing a wood wagon wheel including the steps of shortening the spokes by cutting them at an accurately determined distance from the axis of the wheel, supporting the shortened spokes and hub in position to receive pressure, pressing onto the ends of the spokes a modern steel rim for the reception of an inflatable rubber tire, and securing the rim upon the spokes by boring a hole through the rim into the spoke and welding a metallic dowel to the rim, said dowel being in position to extend into the hole in the spoke.

SAMUEL A. HUEBNER.